United States Patent
Chen et al.

(10) Patent No.: US 9,531,761 B2
(45) Date of Patent: *Dec. 27, 2016

(54) METHOD AND SYSTEM FOR PRIORITIZING AND SCHEDULING SERVICES IN AN IP MULTIMEDIA NETWORK

(75) Inventors: Xuemin Chen, Rancho Santa Fe, CA (US); Gordon Yong Li, San Diego, CA (US); Sam Anderson, Surrey (CA); Pierre Couilaud, Vancouver (CA)

(73) Assignee: BROADCOM CORPORATION, Irvine, CA (US)

(*) Notice: Subject to any disclaimer, the term of this patent is extended or adjusted under 35 U.S.C. 154(b) by 1431 days.

This patent is subject to a terminal disclaimer.

(21) Appl. No.: 12/829,179

(22) Filed: Jul. 1, 2010

(65) Prior Publication Data

US 2012/0005347 A1 Jan. 5, 2012

(51) Int. Cl.
*G06F 15/173* (2006.01)
*H04L 29/06* (2006.01)
*H04L 29/08* (2006.01)

(52) U.S. Cl.
CPC ....... *H04L 65/1016* (2013.01); *H04L 65/1036* (2013.01); *H04L 67/303* (2013.01); *H04L 67/327* (2013.01)

(58) Field of Classification Search
USPC ........................................ 709/226
See application file for complete search history.

(56) References Cited

U.S. PATENT DOCUMENTS

2006/0221828 A1* 10/2006 Towle ................... 370/230
2009/0225762 A1*  9/2009 Davidson et al. ........ 370/401

* cited by examiner

Primary Examiner — Hua Fan
(74) Attorney, Agent, or Firm — Foley & Lardner LLP; Christopher J. McKenna; Paul M. H. Pua

(57) ABSTRACT

An IP multimedia gateway (IMG) determines device capabilities and proposed service priority profiles of communicatively coupled client devices. The determined device capabilities and proposed service priority profiles are transmitted to service managers for service scheduling. Device capabilities of the communicatively coupled client devices are configured or prioritized based on available actual service priority profiles from the service managers. The configured device capabilities are transmitted to the service managers for subsequent service scheduling. Services provided by the service managers are announced based on the available actual service priority profiles. The IMG communicates content for the announced services between the communicatively coupled client devices and the service managers. The IMG may allow the user of a client device to access desired content via other client devices. Content and/or downloaded content for carrier grade services are provided to one or more non-carrier grade client devices when needed.

20 Claims, 8 Drawing Sheets

METHOD AND SYSTEM FOR PRIORITIZING AND SCHEDULING SERVICES IN AN IP MULTIMEDIA NETWORK

CROSS-REFERENCE TO RELATED APPLICATIONS/INCORPORATION BY REFERENCE

This application makes reference to:
U.S. application Ser. No. 12/829,145 filed on Jul. 1, 2010,
U.S. application Ser. No. 12/829,212 filed on Jul. 1, 2010,
U.S. application Ser. No. 12/828,549 filed on Jul. 1, 2010,
U.S. application Ser. No. 12/828,652 filed on Jul. 1, 2010,
U.S. application Ser. No. 12/837,045 filed on Jul. 15, 2010,
U.S. application Ser. No. 12/837,052 filed on Jul. 15, 2010, and
U.S. application Ser. No. 12/837,089 filed on Jul. 15, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for prioritizing and scheduling services in an IP multimedia network.

BACKGROUND OF THE INVENTION

Telecommunication technologies have evolved from analog to digital technologies, and continues to evolve from circuit switched to packet switched, from connection oriented packet switching to connectionless packet switching, and from narrow band application to broadband applications. The accompanied evolution in telecommunication technologies has significantly advanced operators' capability to offer broadband, IP-based multimedia services (IMS) ranging from entertainment and lifestyle applications such as mobile TV and mobile payment to professional services such as video conferencing and real-time data exchange.

IMS defines a standard framework for the deployment of next generation Web-based application services. IMS defines how these services connect and communicate with the underlying telecommunications network(s) and how they integrate with the network provider's back-end systems. IMS combines voice and data in one packet switched network such as, for example, the GPRS core network and the LTE core network, to offer network controlled multimedia services. Various Internet Protocols (IPs) such as the Session Initiation Protocol (SIP), the User Datagram Protocol (UDP), the Transmission Control Protocol (TCP) and Real-Time Transport Protocol (RTP) are widely utilized for delivery of various forms of multimedia applications over IP networks. SIP is an end-to-end application layer signaling protocol that is utilized to setup, modify, and teardown multimedia sessions such as audio/videoconferencing, interactive gaming, virtual reality, and call forwarding over IP networks. UDP and TCP are transport layer protocols that are used for data delivery over IP networks. TCP guarantees data delivery and integrity, however, UDP does not exclusively guarantee delivery of data. RTP is the Internet protocol which transports real-time data such as audio and video data. RTP does not exclusively guarantee real-time delivery of data, but it does provide mechanisms for the sending and receiving applications to support streaming and/or conversational data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for prioritizing and scheduling services in an IP multimedia network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for prioritizing and scheduling services in an IP multimedia network. In various embodiments of the invention, an IP multimedia gateway (IMG) may be operable to determine device capabilities and proposed service priority profiles of one or more of a plurality of client devices communicatively coupled to the IMG. The determined device capabilities and proposed service priority profiles may be transmitted or communicated to one or more service managers for real-time service scheduling. The transmitted device capabilities and service priority profiles may be utilized by the service managers to generate or provide available actual service priority profiles for the communicatively coupled client devices. The IMG may communicate content for services between one or more of the communicatively coupled client devices and the service managers based on the available actual service priority profiles provided by the service managers. The IMG may dynamically configure device capabilities of the one or more of the communicatively coupled client devices based on the available actual service priority profiles. The configured device capabilities may be transmitted back to the service managers for subsequent service provisioning and/or scheduling. Services provided by the service managers may be announced by the IMG based on the available actual service priority profiles to notify the communicatively coupled client devices. Content for the announced services may be communicated between one or more of the communicatively coupled client devices and the service managers. In this regard, the IMG may be operable to allow the user of a client device to access desired content via other client devices. Content and/or downloaded content for carrier-grade services may be shared or provided to one or more non-carrier grade client devices when needed.

Figure 1:
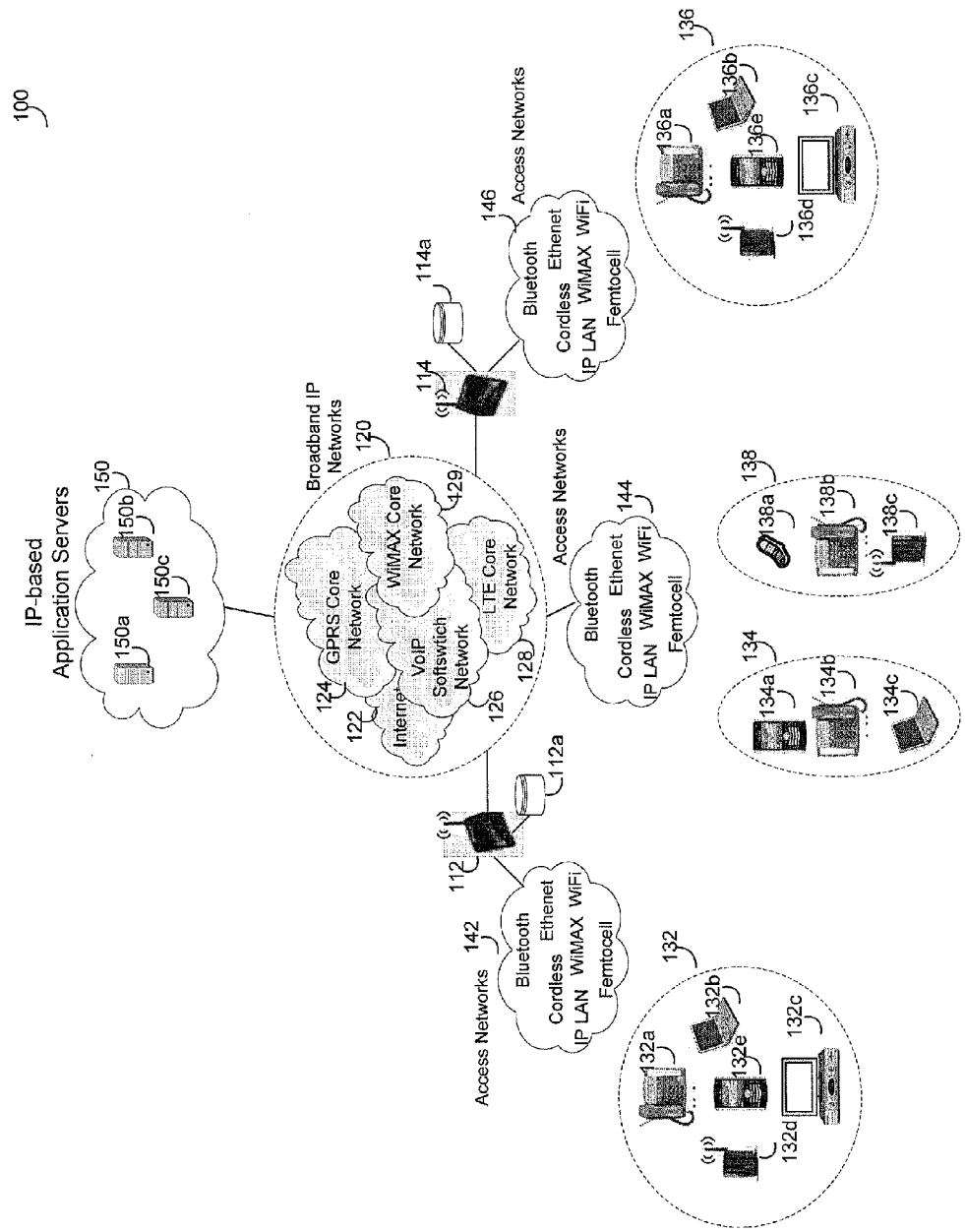
FIG. 1 is a diagram illustrating an exemplary communication system that is operable to utilize a generic IP multimedia residential gateway (IMRG) to support service prioritization and scheduling in an IP multimedia network, in accordance with an embodiment of the invention.

FIG. 1 is a diagram illustrating an exemplary communication system that is operable to utilize a generic IP multimedia residential gateway to support service prioritization and scheduling in an IP multimedia network, in accordance with an embodiment of the invention. Referring to FIG. 1, there is shown a communication system 100 comprising a plurality of IP multimedia residential gateways (IMRGs), of which IMRGs 112-114 are illustrated, broadband IP networks 120, a plurality of client devices 132a~132e, 134a~134c, 136a~136e, and 138a~138c, which are collectively referred to herein as client devices 132, 134, 136 and 138, respectively, a plurality of access networks 142-146, and IP-based application servers 150, of which service servers 150a~150c are displayed.

An IMRG such as the IMRG 112 may comprise suitable logic, circuitry, interfaces and/or code that are operable to connect the client devices 132a-132e to the broadband IP networks 120 for services of interest. A service may be described or represented by the service type and the service class. The type of a service refers to as the type of information to be transferred such as data, voice, text or video for the service. A service with a given service type may be classified into a plurality of exemplary scheduling service classes, namely, data services for Internet access and messaging, conversational services for carrier grade voice and/ or video calls and conferences, video services for TV, video and music streaming, gaming services for users to interact with one another via a central server, and corporate VPN services for access to enterprise intranet/email.

Depending on service level agreements between subscribers and service managers such as the IP-based application server 150a, services may be provided by the service managers to the subscribers with different service performance or quality levels such as a carrier grade or a non-carrier grade. A carrier grade, also called a carrier class, refers to a system, hardware and/or component or function that is extremely reliable, and proven in its capabilities to ensure service integrity and service performance or quality levels. A carrier grade may indicate a strong authentication control which may yield high quality and security. A non-carrier grade, also called an enterprise grade, refers to a system, a hardware and/or component or function that is not reliable and secure enough to ensure service integrity. Services that are provided by the service managers such as the IP-based application server 150a with a carrier grade are referred to as carrier grade services. Carrier grade services may comprise VoIP services, IPTV services, music and radio streaming services, Internet services and/or push-to-talk services. Services that are provided by the service managers such as the IP-based application server 150a with a non-carrier grade, that is, with a less authentication control, are referred to as non-carrier grade services. In this regard, carrier grade services may be scheduled by the service managers for delivery with guaranteed service integrity to the subscribers. Non-carrier grade services may be delivered when needed without guaranteed reliability and stability. A client device that receives a carrier grade service from the service managers is referred to as a carrier grade client device. A client device that receives a non-carrier grade service from the service managers is referred to as a non-carrier grade client device.

Specific requirements may be placed on access networks and core networks for each service type and/or class to ensure desired end-to-end QoS. The service requirements on access networks and core networks may comprise, for example, system timing, CODEC, transmission rates, power-saving mechanisms, security profiles and content types. The system timing may be utilized to synchronize communications for delivery of service. The CODEC may comprise G.711, G.729, G.723, MPEG-4, VC-1, and VP6, for example. The power-saving mechanisms may comprise various power levels, which may be utilized within certain time intervals, for service transmissions. The security profiles may comprise service security descriptions such as, for example, security configurations and policies. The security configuration of a service may comprise protocols, credentials, and actions such as authentication actions. The content type of a service may specify what type of content that the service may comprise. The content type for a service may comprise, for example, Multipart Internet Mail Extensions (MIME) files, HTML pages, H.262, H.263, H.264/AVC video, G.711, BV16 and/or BV32 voice, and DOCSIS Set-top Gateway (DSG) multimedia.

U.S. application Ser. No. 12/829,145, filed Jul. 1, 2010, provides detailed descriptions of an IP multimedia residential gateway (IMRG) that may be operable to couple a plurality of communication devices to a plurality of broadband IP networks utilizing device-dependent interfaces for device access and technology-dependent broadband connections for network access, and is hereby incorporated herein by reference in its entirety.

The IMRG 112 may be operable to integrate local client devices as well as remote client devices to the broadband IP networks 120. Client devices such as the client devices 132a-132e that may access the IMRG 112 via device-dependent interfaces are referred to as local client devices for the IMRG 112. A device-dependent interface may generally represent the PHY and MAC functionality of a particular access technology such as, for example, Ethernet, Wi-Fi, Bluetooth, cordless, and/or Femtocell. Client devices such as the client devices 134a-134c that may access the IMRG 112 via device-independent interfaces such as the broadband IP networks 120 are referred to as remote client devices for the IMRG 112. Client devices such as the client devices 136a-136e that may remotely access the IMRG 112 via other IMRGs such as the IMRG 114 are also referred to as remote client devices for the IMRG 112.

The IMRG 112 may be operable to perform automatic device and network discovery by utilizing proprietary methods and/or well-known networking protocols such as UPnP and DHCP, or a combination of both. For example, the IMRG 112 may be operable to multicast a discovery message. The IMRG 112 may discover or identify communicatively coupled devices and/or networks from responses received to the discovery message. In this regard, the IMRG 112 may be operable to retrieve or determine, from the received responses, client device capabilities for the discovered devices, and/or network capabilities for the discovered networks.

The network capabilities may comprise interface types, processing protocols, service types, service classes and service requirements on network side. The interface types for the identified networks may comprise technology specific broadband IP connections such as DSL, Cable, FTTx, PLC and WiMAX. The protocols may comprise service layer protocols such as SSL and STP, technology-independent IP layer protocols such as SIP, TCP, and technology-dependent IP layer protocols such as Base Station System GPRS Protocol (BSSGP).

The client device capabilities may comprise interface types, processing protocols, service types, service classes, and/or service requirements. The interface types for the identified device may comprise access interface types such as Multimedia over Coax Alliance (MoCa), WiFi, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Sockets Layer (SSL) and control protocols such as Spanning Tree Protocol (STP). The IP layer protocols may comprise IP signaling protocols such as SIP and H.323 and IP media transport protocols such as TCP, UDP, RTP, RTC and RTCP. The link layer protocols may comprise technology-specific PHY and MAC layer protocols such as, for example, MoCa, WiFi, Ethernet, Femtocell, and/or cordless.

In an exemplary embodiment of the invention, the IMRG 112 may be operable to communicate with service managers to enable provisioning and/or real-time scheduling of services. The IMRG 112 may be operable to negotiate with the service managers for a priority profile available for each of communicatively coupled client devices. A service priority profile may comprise information such as, for example, QoS levels and service priorities that the user is entitled or allowed to request and receive. Service priorities are referred to as service class priorities that client devices may establish or may be subscribed to. Depending on service agreement between the client devices and one or more service managers, different service classes may be subscribed or established with different service priorities. For example, a client device such as the client device 132a may subscribe to a service class such as video and music streaming with higher service priorities, and other service classes such as best-effort Internet access with lower service priorities.

Different service priority profiles may be set or proposed by different client devices based on device capabilities and/or user preferences. In this regard, the IMRG 112 may be operable to communicate device capabilities and proposed service priority profiles of communicatively coupled client devices to the service managers. The IMRG 112 may be operable to receive available actual service priority profiles from the service managers. The received available actual service profiles may be generated by the service managers for the communicatively coupled client devices based on corresponding device capabilities and proposed service priority profiles. The IMRG 112 may determine whether to accept the available actual service priority profiles provided by the service managers. In instances where the IMRG 112 decides to accept the available actual service priority profiles received from the service managers, the IMRG 112 may acknowledge the service managers for the acceptance of the available actual service priority profiles. In instances where the IMRG 112 decides not to accept the available actual service priority profiles, the IMRG 112 may communicate with the communicatively coupled client devices to update the proposed service priority profiles. The IMRG 112 may communicate the updated service priority profiles to the service managers for further consideration.

In an exemplary embodiment of the invention, the IMRG 112 may be operable to dynamically configure or prioritize device capabilities for the communicatively coupled client devices based on available actual service priority profiles provided by the service managers. The IMRG 112 may be operable to prioritize the usage of device capabilities such as an audio decoder and a video decoder based on the available actual service priority profiles in order to ensure availability of specific device capabilities when they are needed. For example, in instances where a video streaming service is provided or scheduled to a client device such as the client device 132d, the IMRG 112 may configure the client device 132d to assign higher priorities to video service processing capabilities such as a video post processing unit that may be utilized for deinterlisting and deblocking operation, and assign lower priorities to graphics and other device capabilities such as audio processor. In instances where a 3D video service is provided or scheduled to the client device 132d, the IMRG 112 may configure the client device 132d to assign service processing capabilities such as 2D graphics with higher priorities, and a video decoder, an audio processor and memory, for example, with lower priorities. The IMRG 112 may be operable to allocate resources to support corresponding device capabilities such as video processing, audio processing and functionalities based on the available actual service priority profiles provided by the service managers.

In an exemplary embodiment of the invention, the IMRG 112 may be operable to announce services provided by the service managers based on the available actual service provider profiles to notify the communicatively coupled client devices what the services are scheduled by the service managers. The IMRG 112 may be operable to communicate content for services between the communicatively coupled client devices and the service managers based on corresponding device capabilities and available actual service priority profiles.

In an exemplary embodiment of the invention, the IMRG 112 may be operable to allow the user of a client device to receive services via other client devices. For example, in instances where a WiFi enabled iPad device such as the client device 132d has limited device capabilities such as access capability for services such as high definition (HD) services, the IMRG 112 may be operable to select one or more of the communicatively coupled client devices, for example, a set-top box (STB), that may comprise device capabilities required for the HD services. In this regard, the IMRG 112 may be operable to notify the user of the client device 132d of the receipt of the HD services via the selected one or more other client devices such as the client device 132c.

In an exemplary embodiment of the invention, the IMRG 112 may be operable to push or deliver carrier grade services to non-carrier grade client devices when possible. For example, the IMRG 112 may be operable to monitor activities of communicatively coupled client devices. In instances where a carrier grade client device such as the client device 132e stops receiving subscribed carrier grade services, the IMRG 112 may stop or suspend delivery of the carrier grade services to the client device 132e. The IMRG 112 may announce that the carrier grade services subscribed by the client device 132e are available to other client devices such as the client device 132c. In instances where a service request is received from a non-carrier grade client device such as the client device 132c for the announced carrier grade services, the IMRG 112 may proceed with communicating content for the carrier grade services between the client device 132c and the service managers.

In an exemplary embodiment of the invention, the IMRG 112 may be operable to store or download content for carrier grade services subscribed by a carrier grade client device such as the client device 132c. The IMRG 112 may provide the stored content for the carrier grade services to one or more non-carrier grade client devices such as the client devices 132d-132e.

A client device such as the client device 132a may comprise suitable logic, circuitry, interfaces and/or code that are operable to receive services from different broadband IP networks through the IMRG 112. In various exemplary embodiments of the invention, the client device 132a may subscribe to or establish different service classes with different service priorities for service reception based on device capabilities and/or user's preferences. For example, the client device 132a may be configured to subscribe to or establish a service class such as video and music streaming with higher service priorities, and other service classes such as best-effort Internet access with lower service priorities. In various exemplary embodiments of the invention, the client device 132a may be operable to utilize an access technology specific interface such as Bluetooth, LTE, WiFi and/or Ethernet to communicate with the IMRG 112 for services offered by different broadband IP networks or the service manager. The client device 132a may also be operable to communicate or exchange information with other client devices registered to the IMRG 112. In this regard, the client device 132a may share information such as available actual service priority profiles with local client devices such as client devices 132b-132e as well as remote client devices such as the client devices 134a-134c. The client device 132a may be dynamically configured to receive services from the broadband IP networks 120 as well as networked client devices such as the client device 132e.

An access network such as the access network 142 may comprise suitable logic, circuitry, communication devices, interfaces and/or code that are operable to communicate services by utilizing various access technologies such as, for example, IP LAN, Bluetooth, WiFi, Femtocell, LTE and WiMAX.

An IP-based application server such as the IP-based application server 150a may comprise suitable logic, circuitry, interfaces and/or code that are operable to provide IP-based services to various broadband IP networks 120. In this regard, the IP-based application server 150a may be configured to deliver carrier grade as well as non-carrier grade broadband access services to users through the broadband IP networks 120.

In an exemplary embodiment of the invention, the IP-based application server 150a may be operable to perform real-time service scheduling for client devices communicatively coupled to the IMRG 112, for example. In this regard, the IP-based application server 150a may receive information such as device capabilities and proposed service priority profiles from the IMRG 112 to facilitate real-time service scheduling for each of client devices such as the client devices 132a-132e communicatively coupled to the IMRG 112. In this regard, the IP-based application server 150a may be operable to generate available actual service priority profiles for the client devices 132a-132e based on corresponding device capabilities and proposed service priority profiles. The generated available actual service priority profiles may be updated in real time or may be delayed. The IP-based application server 150a may schedule or provide services to the client devices 132a-132e based on the generated available actual service priority profiles.

Although IP multimedia residential gateways (IMRGs) are illustrated in FIG. 1 for prioritizing and scheduling services in an IP multimedia network, the invention may not be so limited. Accordingly, other IP multimedia gateways for prioritizing and scheduling services in an IP multimedia network may be supported without departing from the spirit and scope of various embodiments of the invention. The IP multimedia gateways may be, for example, IP multimedia residential gateway (IMRGs) which may be located at a residential location. The IP multimedia gateways may be located in non-residential locations comprising, for example, a commercial building, an office, an office complex, an apartment building and/or a factory.

In an exemplary operation, an IMRG such as the IMRG 112 may be operable to communicatively couple or connect a plurality of communicatively coupled client devices to the broadband IP networks 120. The IMRG 112 may be operable to track or monitor activities of the communicatively coupled client devices such as the client devices 132a-132e. The IMRG 112 may be operable to support real-time service scheduling by communicating with the service managers. In this regard, the IMRG 112 may provide device capabilities and service priority profiles proposed by the client devices 132a-132e to the service managers. The IMRG 112 may receive available actual service priority profiles that are generated by the service managers for the client devices 132a-132e based on corresponding device capabilities and proposed service priority profiles. The IMRG 112 may be operable to dynamically configure or prioritize device capabilities of the client devices 132a-132e based on the received available actual service priority profiles. Services provided by the service managers may be announced by the IMRG 112 to notify the communicatively coupled client devices based on the received available actual service priority profiles.

The IMRG 112 may be operable to communicate content for the announced services between the communicatively coupled client devices and the service managers based on corresponding device capabilities and available actual service priority profiles. In instances where a client device such as a WiFi enabled iPad device 132d has no sufficient device capabilities such as access capability to support a desired service such as a HD service, the IMRG 112 may signal or instruct the user of the client device 132d to receive the HD service via one or more other client devices such as the client devices 132c that comprise sufficient device capabilities for the HD service. The IMRG 112 may be operable to track or monitor device activities such as the usage of carrier grade services of a carrier grade client device. The IMRG 112 may stop or resume delivery of the carrier grade services to the carrier grade client device. For example, in instances where the carrier grade client device does not receive or need the carrier grade client devices within a certain time period, the IMRG 112 may stop delivery of the carrier grade services to the carrier grade client device during the certain time period.

The IMRG 112 may be configured to forward and/or delegate, if requested, handling of the carrier grade services to one or more other client devices during the certain time period. The carrier grade services may be resumed on the carrier grade client device whenever needed. The content for the carrier grade services may be downloaded or stored by the IMRG 112 into the local database 112a. The stored content for the carrier grade services may be provided or communicated to one or more non-carrier grade client devices such as the client devices 132d~132e if requested.

Figure 2:
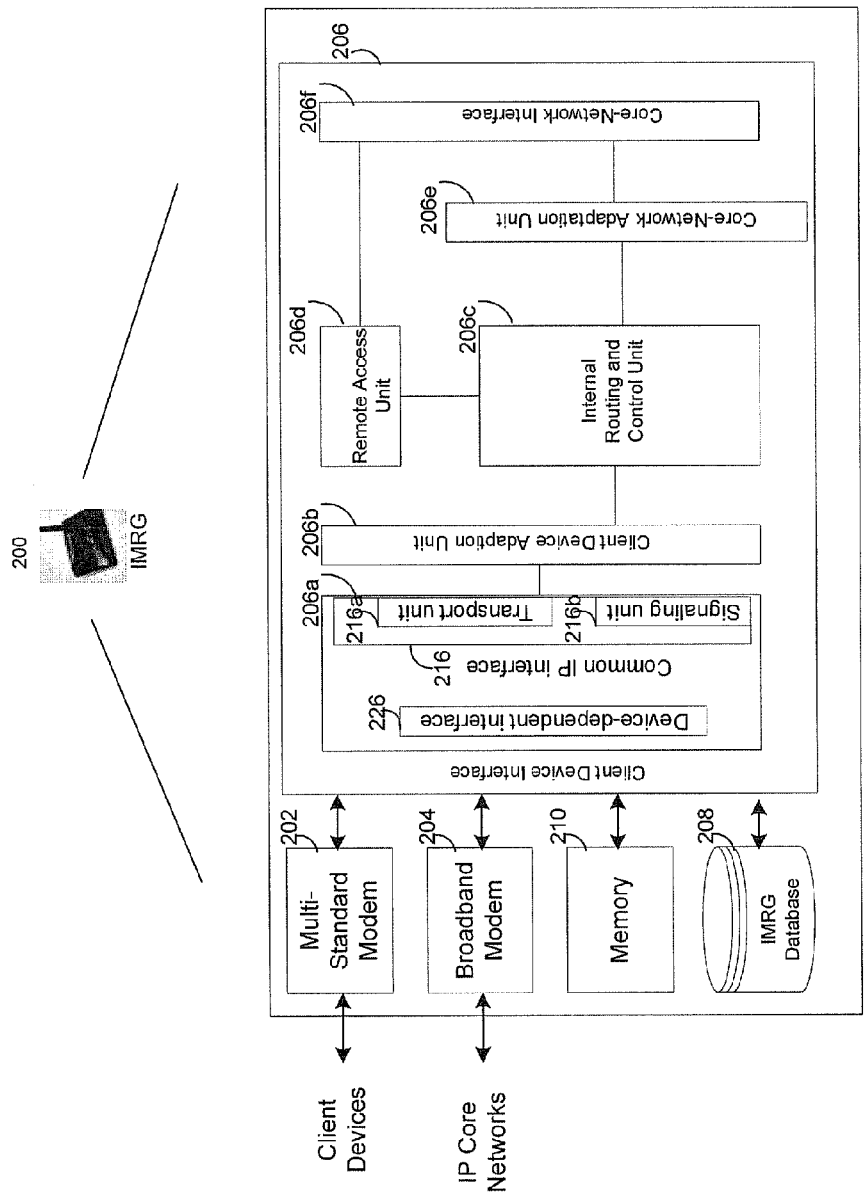
FIG. 2 is a diagram illustrating an exemplary generic IP multimedia residential gateway (IMRG) that is operable to support service prioritization and scheduling in an IP multimedia network, in accordance with an embodiment of the invention.

FIG. 2 is a diagram illustrating an exemplary generic IP multimedia residential gateway that is operable to support service prioritization and scheduling in an IP multimedia network, in accordance with an embodiment of the invention. Referring to FIG. 2, there is shown an IP multimedia residential gateway (IMRG) 200 comprising a multi-standard modem 202, a broadband modem 204, an IMRG processor 206, an IMRG database 208 and a memory 210.

The multi-standard modem 202 may comprise suitable logic, circuitry, interfaces and/or code that are operable to communicate with a plurality of client devices such as the client devices 132a-132e and 134a-134c utilizing a device-dependent interface such as, for example, Ethernet, Wi-Fi, Bluetooth, cordless, and/or Femtocell.

The broadband modem 204 may comprise suitable logic, circuitry, interfaces and/or code that are operable to transmit voice and/or data in adherence with one or more internet protocol (IP) broadband standard. The broadband modem 204 may be operable to transmit and/or receive voice and/or data to and/or from the broadband IP networks 120 over broadband connections such as, for example, T1/E1 line, DSL, Cable, FTTx, PLC and WiMAX. The broadband modem 204 may dynamically configure one or more network interfaces utilized within the broadband modem 204 towards to the broadband IP networks 120. For example, in instances where the broadband modem 204 is signaled to exchange information with the VoIP softswitch network 126, the broadband modem 204 may be configured to utilize FTTx as an access solution to the VoIP softswitch network 126.

The IMRG processor 206 may comprise suitable logic, circuitry, interfaces and/or code that are operable to perform a variety of signal processing tasks to maintain or manage communication between associated client devices and the broadband IP networks 120, and/or among associated client devices. The IMRG processor 206 may comprise a client device interface 206a, a client device adaptation unit 206b, an internal routing and control unit 206c, a remote access unit 206d, a core-network adaptation unit 206e and a core-network interface 206f.

The client device interface 206a may comprise suitable logic, circuitry, interfaces and/or code that are operable to perform protocol conversion for client device access. The client device interface 206a may comprise a device-dependent interface 226 and a common IP interface 216. The device-dependent interface 226 may comprise suitable logic, circuitry, interfaces and/or code that are operable to access local client devices over device-dependent connections such as WiFi and LTE connections. The device-dependent interface 226 may be operable to support link layer protocols for specific PHY and MAC functionality of a particular access technology. For example, in instances where the client device interface 206a is signaled to access a WiFi enabled client device such as the client device 132c, the client device interface 206a may exchange information with the client device 132c utilizing WiFi air interface protocols for corresponding link layer communication. The device-dependent interface 226 may support different IP transport and/or signaling components utilized by client devices. The common IP interface 216 may comprise suitable logic, circuitry, interfaces and/or code that are operable to provide a common IP support to communicate content between various client devices and the broadband IP networks 120. The common IP interface 216 may comprise a transport unit 216a and a signaling unit 216b. The transport unit 216a may comprise suitable logic, circuitry, interfaces and/or code that are operable to provide a single IP transport component such as RTP to support data communication over IP. The signaling unit 216b may comprise suitable logic, circuitry, interfaces and/or code that are operable to provide a single IP signaling component such as SIP to support signaling communication over IP. The client device interface 206a may perform protocol mapping or translation between different IP transport and/or signaling components utilized by client devices and the common IP-based interface 216 running on the IMRG processor 206.

The client device adaptation unit 206b may comprise suitable logic, circuitry, interfaces and/or code that are operable to adapt a wide range of client devices. In this regard, the client device adaptation unit 206b may be operable to perform, for example, media or content transcoding, rate conversion, system timing adjustment and/or power control based on corresponding client device capabilities to improve user experiences.

The internal routing and control unit 206c may comprise suitable logic, circuitry, interfaces and/or code that are operable to route and distribute media, signaling and event packets among client devices communicatively coupled to the IMRG 112, for example. The internal routing and control unit 206c may collect or track client device capabilities and available actual service priority profiles for associated client devices and network capabilities to build the IMRG database 208.

In various exemplary embodiments of the invention, the internal routing and control unit 206c may be operable to monitor activities of communicatively coupled client devices such as the client devices 132a-132e. The internal routing and control unit 206c may be operable to perform real-time service scheduling by communicating with the service managers such as the IP-based application servers 150. The internal routing and control unit 206c may communicate device capabilities and proposed service priority profiles for the communicatively client devices such as the client devices 132a-132e to the IP-based application servers 150 for service scheduling. The internal routing and control unit 206c may receive available actual service priority profiles for the client devices 132a-132e from the IP-based application servers 150. The internal routing and control unit 206c may utilize the received available actual service priority profiles to dynamically configure or prioritize device capabilities of the client devices 132a-132e. The internal routing and control unit 206c may announce services provided by the service managers according to the received available actual service priority profiles to notify the client devices 132a-132e. The internal routing and control unit 206c may be operable to allow the user of a client device such as the client device 132a to access a desired service even in instances when the client device 132a does not comprise sufficient device capabilities required for the desired service. For example, the user of a WiFi enabled iPad device such as the client device 132d may be signaled to receive, for example, HD services, via one or more other client devices such as the client devices 132c comprising sufficient device capabilities for the HD services. The internal routing and control unit 206c may be operable to manage the usage of available services such as carrier grade services among the communicatively coupled client devices. The internal routing and control unit 206c may stop or resume delivery of the carrier grade services to a corresponding carrier grade client device such as the client device 132c depending on the need of the carrier grade client device. In instances where the carrier grade client device does not need the carrier grade services within a certain time period, the internal routing and control unit 206c may provide or forward the carrier grade services to one or more non-carrier grade client devices such as the client devices 132e-132e if requested. The internal routing and control unit 206c may also be operable to download content for the carrier grade services and store the downloaded content into the IMRG database 208. The internal routing and control unit 206c may be operable to push or communicate the stored content for the carrier grade services to one or more non-carrier grade client devices such as the client device 132d-132e when needed.

The remote access unit 206d may comprise suitable logic, circuitry, interfaces and/or code that are operable to provide necessary functionality for the support of remote access by client devices that are roaming outside of a local coverage of the IMRG 112. In this regard, the remote access unit 206d may be operable to exchange information with remote client devices over broadband connections to the broadband IP networks 120.

The core-network adaptation unit 206e may comprise suitable logic, circuitry, interfaces and/or code that are operable to provide adaptation to different broadband IP networks for various client devices. In this regard, the core-network adaptation unit 206e may perform, for example, protocol translation and mapping between a common IP protocol utilized by the IMRG 200 and protocols used by different broadband IP networks.

The core-network interface 206f may comprise suitable logic, circuitry, interfaces and/or code that are operable to provide various broadband connections such as, for example, DSL, Cable, FTTx, PLC and WiMAX for access to the broadband IP networks 120.

The IMRG database 208 may comprise suitable logic, circuitry, interfaces and/or code that are operable to store and manage client device information and network information. In this regard, the IMRG database 208 may comprise registration status information for associated client devices. The registration status for a client device pertaining to the IMRG 200 may be a local client device or a remote client device. The IMRG database 208 may be operable to track or collect client device capabilities, available actual service priority profiles and network capabilities. The collected capability information may be utilized to dynamically configure the IMRG 200 as well as client devices pertaining to the IMRG 200. The IMRG database 208 may comprise RAM, ROM, low latency nonvolatile memory such as flash memory and/or other suitable electronic data storage capable of storing data and instructions The memory 210 may comprise suitable logic, circuitry, interfaces and/or code that are operable to store and manage data and/or other information utilized by the IMRG processor 206. For example, the memory 210 may be utilized to store processed data or content generated by the IMRG processor 206. The memory 210 may be enabled to store executable instructions to process, for example, protocol mapping and/or media transcoding. The memory 210 may comprise RAM, ROM, low latency nonvolatile memory such as flash memory and/or other suitable electronic data storage capable of storing data and instructions.

In an exemplary operation, an IMRG such as the IMRG 200 may provide connections for communicatively coupled client devices to the broadband IP networks 120. The IMRG 200 may be operable to track or monitor device capabilities and service priority profiles of communicatively coupled client devices. The internal routing and control unit 206c may be operable to perform real-time service scheduling together with one or more service managers such as the IP-based application servers 150. Each of the communicatively coupled client devices may propose a service priority profile based on corresponding device capabilities and user preferences, for example. Device capabilities and proposed service priority profiles of the communicatively coupled client device such as the client devices 132a-132e may be provided to the IP-based application servers 150 for real-time service scheduling. The internal routing and control unit 206c may utilize available actual service priority profiles provided by the IP-based application servers 150 to dynamically configure or prioritize device capabilities of the client devices 132a-132e. The user of a client device such as the client device 132a may be allowed to access a desired service via other client devices even when the client device 132a does not comprise device capabilities required for the desired service.

The internal routing and control unit 206c may be operable to coordinate the usage of available services such as carrier grade services among the client devices 132a-132e. The internal routing and control unit 206c may stop or resume delivery of the carrier grade services to a corresponding carrier grade client device depending on the need of the carrier grade client device. The internal routing and control unit 206c may be operable to provide the carrier grade services to one or more non-carrier grade client devices such as the client devices 132d-132e whenever needed. In addition, the internal routing and control unit 206c may download content for the carrier grade services into the IMRG database 208 to be provided to non-carrier grade client devices such as the client devices 132d-132e when needed.

Figure 3:
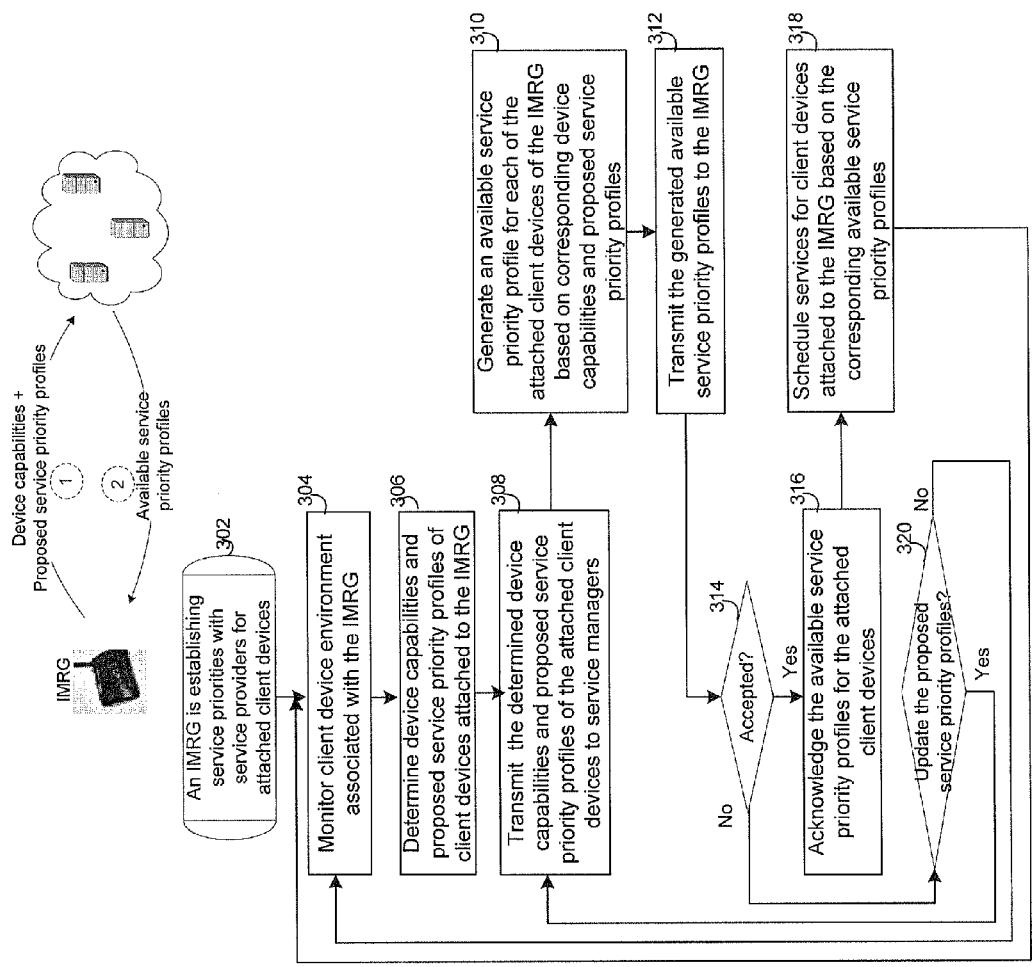
FIG. 3 is a block diagram illustrating exemplary steps that may be performed to negotiate available actual service priority profiles between a generic IP multimedia residential gateway (IMRG) and service managers based on client device capabilities and proposed service priorities, in accordance with an embodiment of the invention.

FIG. 3 is a block diagram illustrating exemplary steps that may be performed to negotiate available actual service priority profiles between a generic IP multimedia residential gateway (IMRG) and the service managers based on client device capabilities and proposed service priorities, in accordance with an embodiment of the invention. Referring to FIG. 3, the exemplary steps may start with step 302. In step 302, an IMRG such as the IMRG 112 may be operable to establish or set up service priorities with one or more service managers for communicatively coupled client devices such as the client devices 132a-132e. In step 304, the IMRG 112 may be operable to monitor activities of the communicatively coupled client devices. In step 306, each of the communicatively coupled client devices of the IMRG 112 may propose a service priority profile based on its own device capabilities and user preferences. The IMRG 112 may be operable to determine device capabilities and proposed service priority profiles of the communicatively coupled client devices. In step 308, the IMRG 112 may be operable to communicate or transmit the determined device capabilities and proposed service priority profiles of the communicatively coupled client devices to the service managers such as the IP-based application servers 150.

In step 310, the service managers may be operable to generate an available actual service priority profile for each of client devices communicatively coupled to the IMRG 112 based on corresponding device capabilities and proposed service priority profiles. In step 312, the service managers may be operable to transmit or communicate the generated available actual service priority profiles to the IMRG 112. In step 314, it may be determined whether the available actual service priority profiles provided by the service managers may be accepted. In instances where the IMRG 112 accepts the provided available actual service priority profiles, then in step 316, the IMRG 112 may be operable to acknowledge the service managers for the acceptance of the provided available actual service priority profiles. In step 318, the service managers may be operable to schedule services for the client devices 132a-132e according to the corresponding available actual service priority profiles. The exemplary steps may return to step 304.

In step 314, in instances where the IMRG 112 does not accept the available actual service priority profiles provided by the service managers, then in step 320, the IMRG 112 may be operable to communicate with the communicatively coupled client devices such as the client devices 132a-132e to determine whether the client devices 132a-132e may update the proposed service priority profiles. In instances where the client devices 132a-132e decide to update the proposed service priority profiles, then the exemplary steps may return to step 308.

In step 320, in instances where the client devices 132a-132e determine not to update the proposed service priority profiles, then the exemplary steps may return to step 304.

Figure 4:
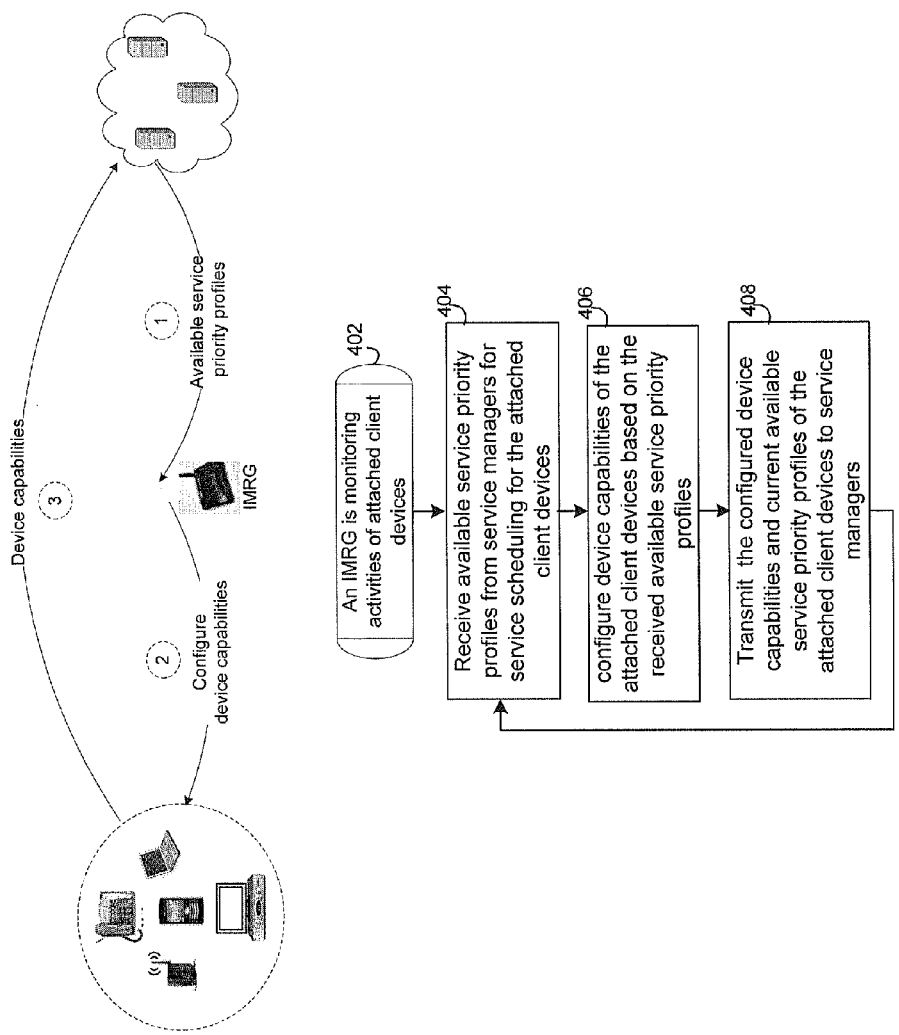
FIG. 4 is a block diagram illustrating exemplary steps that may be performed by a generic IP multimedia residential gateway (IMRG) to dynamically configure device capabilities of communicatively coupled client devices based on available actual service priority profiles provided by service managers, in accordance with an embodiment of the invention.

FIG. 4 is a block diagram illustrating exemplary steps that may be performed by a generic IP multimedia residential gateway (IMRG) to dynamically configure device capabilities of communicatively coupled client devices based on available actual service priority profiles provided by the service managers, in accordance with an embodiment of the invention. Referring to FIG. 4, the exemplary steps start with step 402. In step 402, an IMRG such as the IMRG 112 may be operable to monitor activities of communicatively coupled client devices such as the client devices 132a-132e. In step 404, the IMRG 112 may be operable to receive available actual service priority profiles from the service managers such as the IP-based application servers 150 for service scheduling. In step 406, the IMRG 112 may be operable to configure or prioritize device capabilities of the communicatively coupled client devices based on the received available actual service priority profiles. In step 408, the IMRG 112 may be operable to communicate or transmit the configured device capabilities of the communicatively coupled client devices to the service managers for subsequent service scheduling. The exemplary steps may return to step 404.

Figure 5:
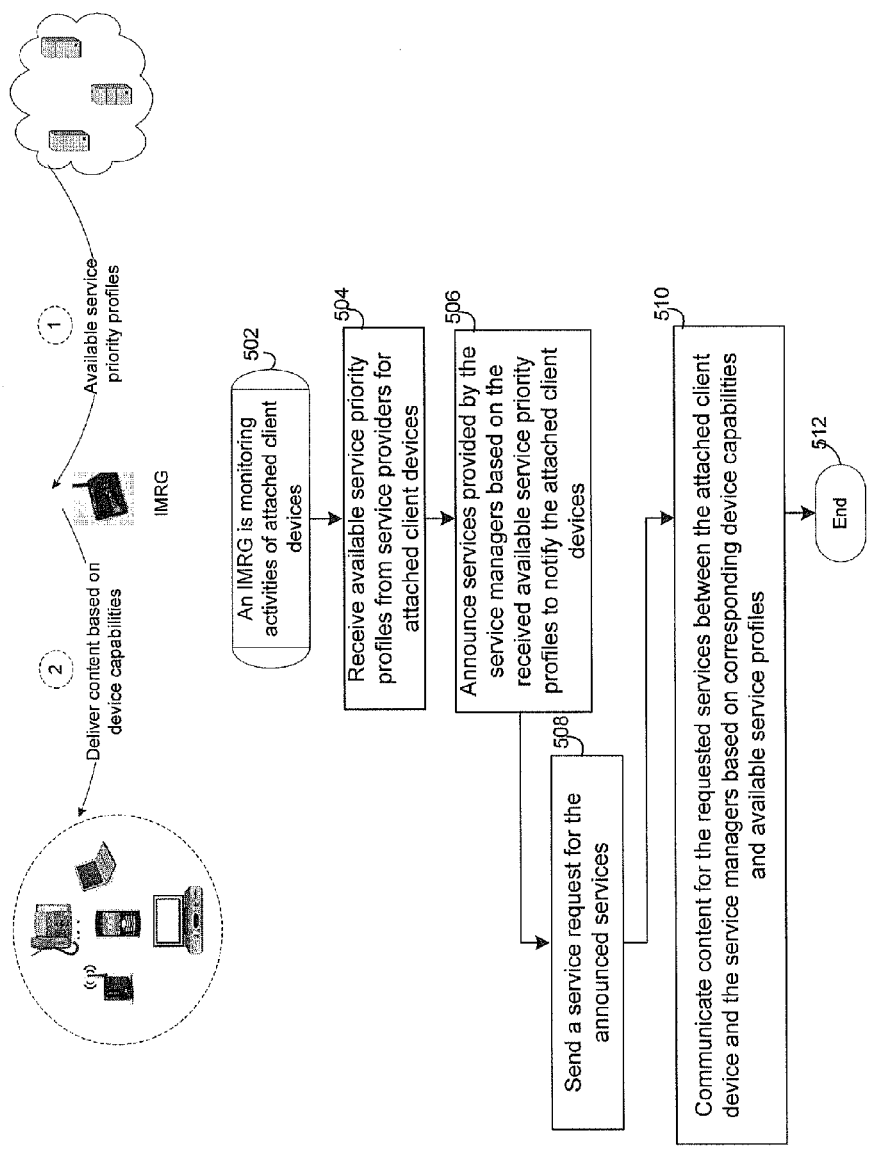
FIG. 5 is a block diagram illustrating exemplary steps that may be performed by a generic IP multimedia residential gateway (IMRG) to notify services available to communicatively coupled client devices based on available actual service priority profiles provided by service managers, in accordance with an embodiment of the invention.

FIG. 5 is a block diagram illustrating exemplary steps that may be performed by a generic IP multimedia residential gateway (IMRG) to notify services available to communicatively coupled client devices based on available actual service priority profiles provided by the service managers, in accordance with an embodiment of the invention. Referring to FIG. 5, the exemplary steps start with step 502. In step 502, an IMRG such as the IMRG 112 may be operable to monitor activities of communicatively coupled client devices such as the client devices 132a-132e. In step 504, the IMRG 112 may be operable to receive available actual service priority profiles from the service managers such as the IP-based application servers 150 for service scheduling. In step 506, the IMRG 112 may be operable to announce services provided by the service managers based on the received available actual service priority profiles to notify the communicatively coupled client devices. In step 508, one or more communicatively coupled client devices such as the client device 132a may be operable to send service requests to the IMRG 112 for the announced services. In step 510, the IMRG 112 may be operable to communicate or transmit content for requested services between the one or more communicatively coupled client devices and the service managers based on corresponding device capabilities and available actual service priority profiles. The exemplary steps may return to step 512.

Figure 6:
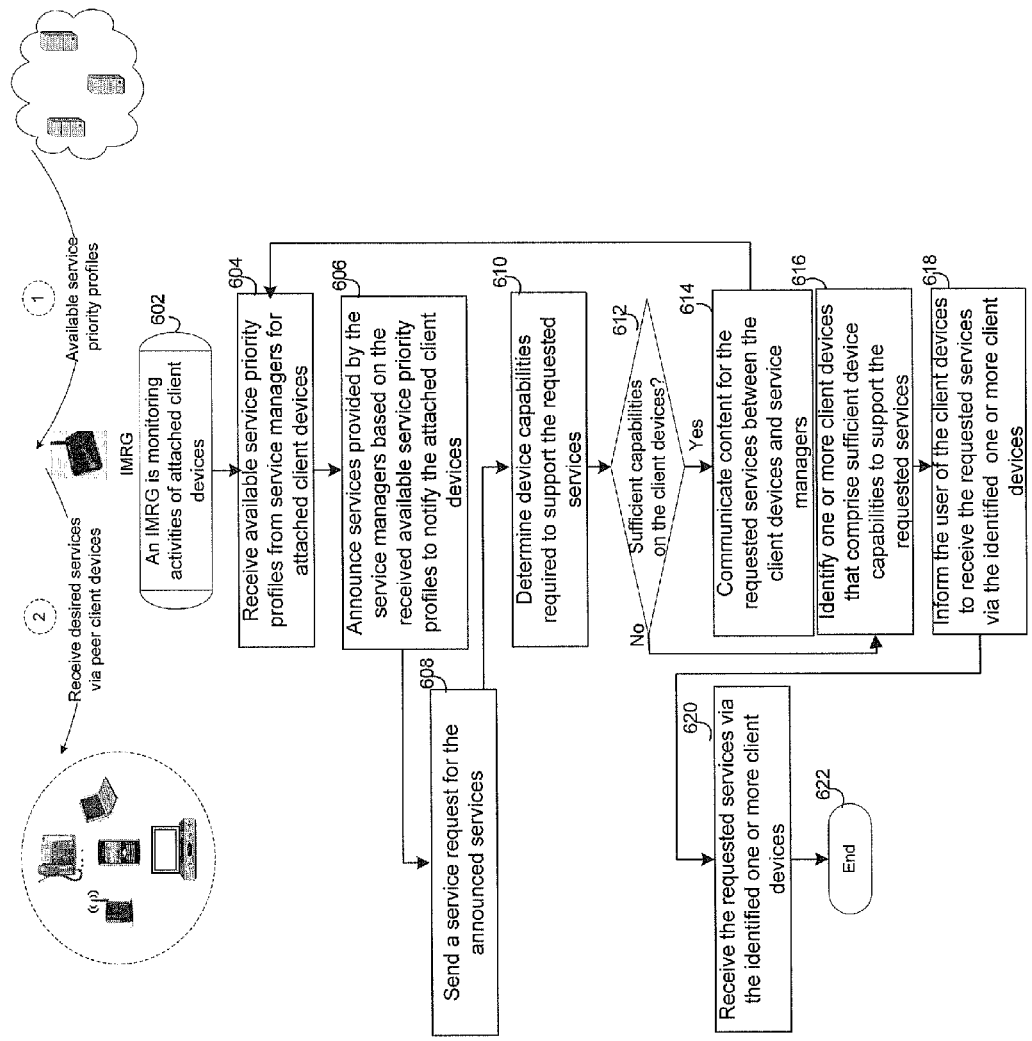
FIG. 6 is a block diagram illustrating exemplary steps that may be performed by a generic IP multimedia residential gateway (IMRG) to allow the user of a client device to receive desired services via other client devices, in accordance with an embodiment of the invention.

FIG. 6 is a block diagram illustrating exemplary steps that may be performed by a generic IP multimedia residential gateway (IMRG) to allow the user of a client device to receive desired services via other client devices, in accordance with an embodiment of the invention. Referring to FIG. 6, the exemplary steps start with step 602. In step 602, an IMRG such as the IMRG 112 may be operable to monitor activities of communicatively coupled client devices such as the client devices 132a-132e. In step 604, the IMRG 112 may be operable to receive available actual service priority profiles from the service managers such as the IP-based application servers 150 for service scheduling for the communicatively coupled client devices. In step 606, the IMRG 112 may be operable to announce services provided by the service managers based on the received available actual service priority profiles to notify the communicatively coupled client devices. In step 608, one or more communicatively coupled client devices such as the client device 132a may be operable to send service requests to the IMRG 112 for the announced services. In step 610, the IMRG 112 may be operable to determine device capabilities required to support the requested services. In step 612, the IMRG 112 may determine whether the client device 132a may comprise sufficient device capabilities to support the requested services. In instances where the client device 132a comprises sufficient device capabilities to support the requested services, then in step 614, the IMRG 112 may be operable to communicate content for the requested services between the client device 132a and the service managers. The exemplary steps may return to step 604.

In step 612, in instances where the client device 132a does not comprise sufficient device capabilities to support the requested services, then in step 616, the IMRG 112 may be operable to select or identify one or more client devices that may comprise sufficient device capabilities to support the requested services. In step 618, the IMRG 112 may be operable to notify or inform the user of the client device 132 to receive the requested services via the identified one or more client devices. In step 620, the client device 132a may be operable to receive the requested services via the identified one or more client devices. The exemplary steps may end in step 622.

Figure 7:
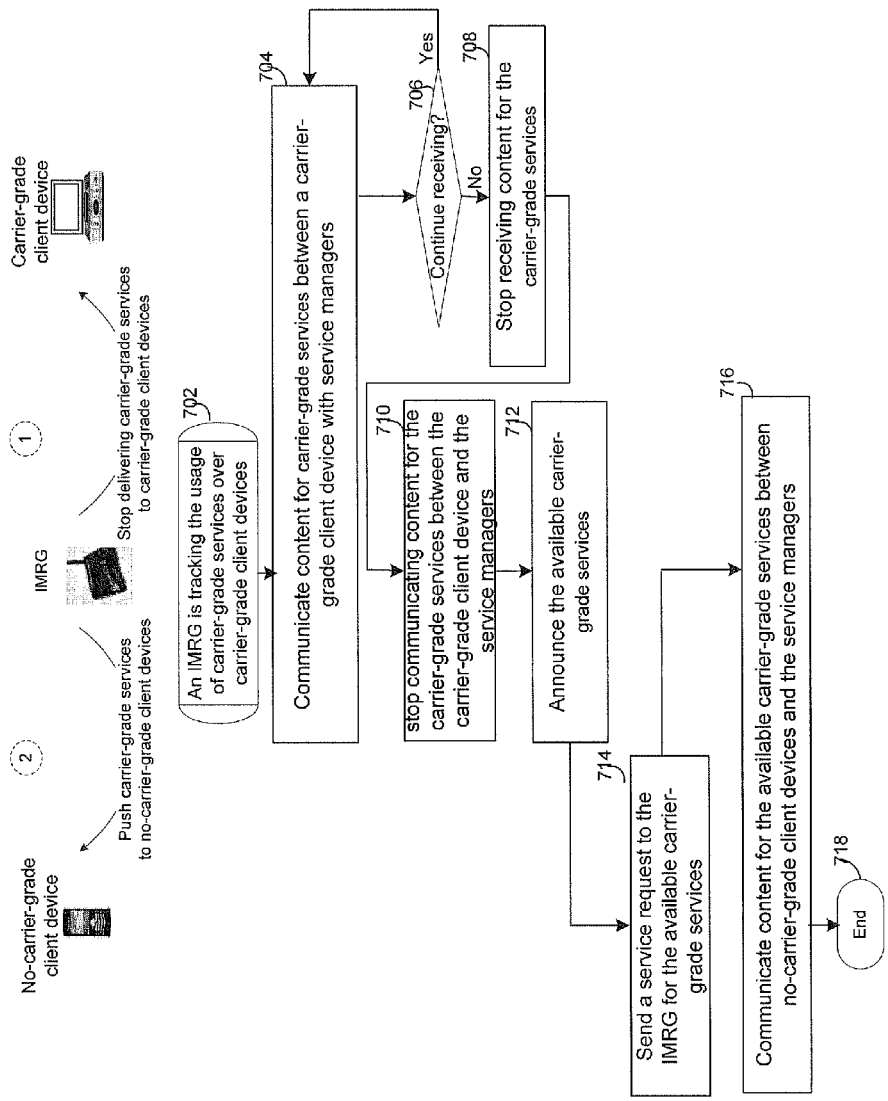
FIG. 7 is a block diagram illustrating exemplary steps that may be performed by a generic IP multimedia residential gateway (IMRG) to schedule and deliver carrier grade services to non-carrier grade client devices, in accordance with an embodiment of the invention.

FIG. 7 is a block diagram illustrating exemplary steps that may be performed by a generic IP multimedia residential gateway (IMRG) to schedule and deliver carrier grade services to non-carrier grade client devices, in accordance with an embodiment of the invention. Referring to FIG. 7, the exemplary steps start with step 702. In step 702, an IMRG such as the IMRG 112 may be operable to monitor the usage of carrier grade services over carrier grade client devices such as the client device 132*c*. In step 704, the IMRG 112 may be operable to communicate content for the carrier grade services between the carrier grade client device and the service managers such as the IP-based application servers 150. In step 706, the carrier grade client device may be operable to determine whether to continue the carrier-grad services. In instances where the carrier grade client device determines to stop receiving the carrier grade services, then in step 708, the carrier grade client device may be configured to stop or suspend receiving content for the carrier grade services.

In step 710, the IMRG 112 may be operable to stop or suspend communicating content for the carrier grade services between the carrier grade client device and the service managers. In step 712, the IMRG 112 may be operable to announce that the carrier grade services are available. In step 714, one or more non-carrier grade client devices such as the client device 132*e* may send service requests to the IMRG 112 for the available carrier grade services. In step 716, the IMRG 112 may be operable to communicate content for the carrier grade services between the non-carrier grade client device and the service managers. The exemplary steps may end in step 718.

In step 706, in instances where the carrier grade client device decides to continue receiving the carrier grade services, then the exemplary steps may return to step 704.

Figure 8:
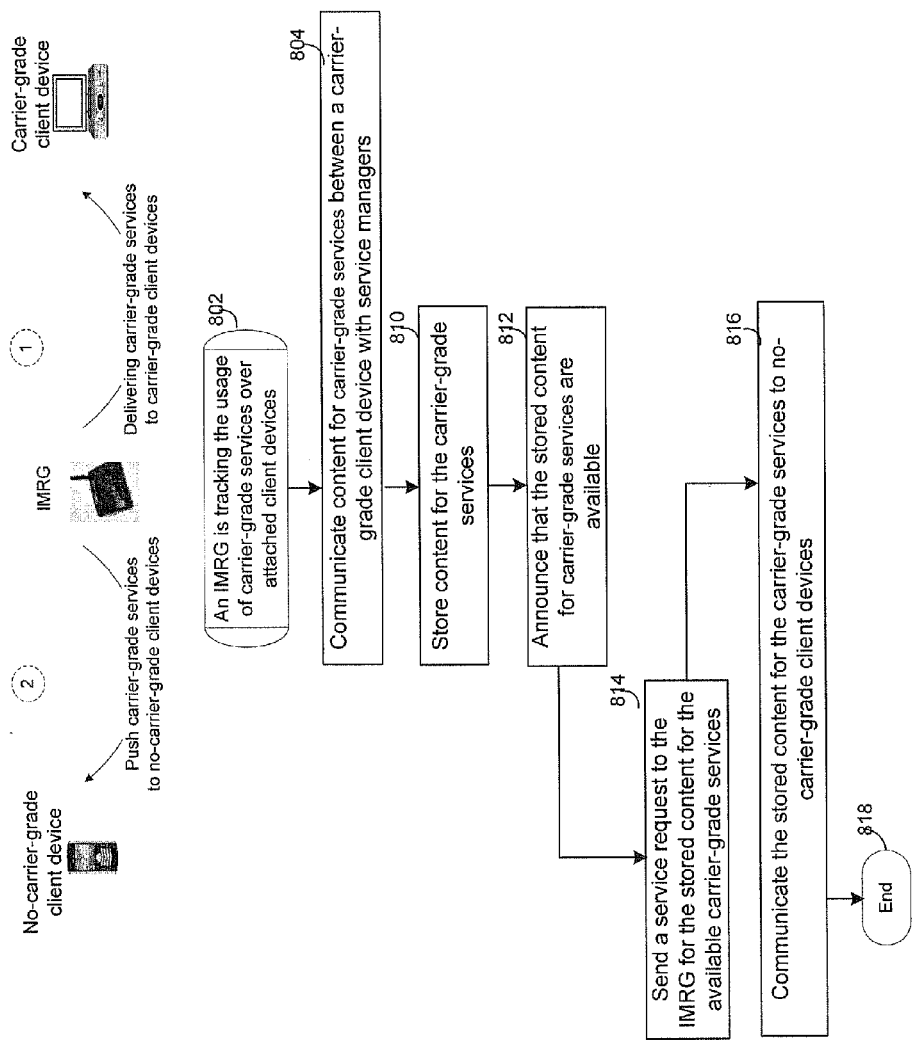
FIG. 8 is a block diagram illustrating exemplary steps that may be performed by a generic IP multimedia residential gateway (IMRG) to push stored content for carrier grade services to non-carrier grade client devices, in accordance with an embodiment of the invention.

FIG. 8 is a block diagram illustrating exemplary steps that may be performed by a generic IP multimedia residential gateway (IMRG) to push stored content for carrier grade services to non-carrier grade client devices, in accordance with an embodiment of the invention. Referring to FIG. 8, the exemplary steps start with step 802. In step 802, an IMRG such as the IMRG 112 may be operable to monitor the usage of carrier grade services over carrier grade client devices such as the client device 132*c*. In step 804, the IMRG 112 may be operable to communicate content for the carrier grade services between the carrier grade client device and the service managers such as the IP-based application servers 150. In step 810, the IMRG 112 may be operable to download or store content for the carrier grade services into the IMRG database 208. In step 812, the IMRG 112 may be operable to announce that the stored content for the carrier grade services are available. In step 814, one or more non-carrier grade client devices such as the client devices 132*a* may be operable to send service requests to the IMRG 112 for the stored content for the carrier grade services. In step 816, the IMRG 112 may be operable to communicate the stored content for the carrier grade services to the one or more non-carrier grade services. The exemplary steps may end in step 818.

In various exemplary aspects of the method and system for prioritizing and scheduling services in an IP multimedia network, an IP multimedia gateway such as the IMRG 112 may be operable to determine device capabilities and proposed service priority profiles of one or more of a plurality of client devices such as the client devices 132*a*-132*e* that are communicatively coupled to the IMRG 112. The IMRG 112 may be operable to transmit or communicate the determined device capabilities and proposed service priority profiles to one or more service managers such as the IP-based application servers 150 via the broadband IP networks 120 for service scheduling. The IP-based application servers 150 may be operable to generate available actual service priority profiles for each of the client devices 132*a*-132*e* based on the corresponding transmitted device capabilities and proposed service priority profiles from the IMRG 112.

The IMRG 112 may be operable to receive the available actual service priority profiles from the service managers such as the IP-based application servers 150. The IMRG 112 may communicate content for services, provided by the IP-based application servers 150, between the client devices 132*a*-132*e* and the IP-based application servers 150. The IMRG 112 may configure or prioritize the device capabilities of the client devices 132*a*-132*e* based on the received available actual service priority profiles. The configured device capabilities of the client device 132*a*-132*e* may be transmitted back to the IP-based application servers 150 to be utilized for subsequent service scheduling. The IMRG 112 may announce services provided by the IP-based application servers 150 based on the received available actual service priority profiles to notify client devices. The IMRG 112 may communicate content for the announced services between the client devices 132*a*-132*e*, for example, and the IP-based application servers 150.

In instances where a client device such as the client device 132*d* has no sufficient device capabilities to support a desired service provided by the IP-based application servers 150, the IMRG 112 may be operable to identify or select one or more communicatively coupled client devices that comprise sufficient device capabilities to support the desired service. The IMRG 112 may notify or signal the user of the client device 132*a* to receive the desired service via the selected one or more communicatively coupled client devices. Services provided by the IP-based application servers 150 may comprise carrier grade services subscribed by, for example, the client device 132*d*. In instances where a carrier grade client device such as the client device 132*a* is not receiving the carrier grade services within a certain time period, the IMRG 112 may be operable to stop communicating content for the carrier-grad services between the carrier grade client devices and the IP-based application servers 150. The IMRG 112 may be operable to communicate the content for the carrier grade services between one or more non-carrier grade client devices and the service managers within the certain time period. Content for the carrier grade services may be downloaded by the IMRG 112 to be stored into the IMRG database 208. The IMRG 112 may be operable to provide or communicate the stored content for the carrier grade services to one or more non-carrier grade client devices when needed.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for prioritizing and scheduling services in an IP multimedia network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in an IP multimedia gateway:
  determining capabilities and a proposed service priority profile of a communication device that is communicatively coupled to said IP multimedia gateway, said proposed service priority profile of said communication device based at least in part on said determined capabilities of said communication device;
  transmitting said determined capabilities and said determined proposed service priority profile to a service manager that is operable to provide services to said communication device;
  receiving an actual service priority profile from said service manager, wherein said received actual service priority profile is generated by said service manager based at least in part on said transmitted capabilities and said transmitted proposed service priority profile; and
  communicating content for services provided by said service manager between said communication device and said service manager based at least in part on said received actual service priority profile.

2. The method according to claim 1, comprising configuring said determined capabilities of said communication device based at least in part on said received actual service priority profile.

3. The method according to claim 2, comprising transmitting said configured capabilities of said communication device to said service manager for subsequent service scheduling.

4. The method according to claim 1, comprising announcing to said communication device services provided by said service manager based at least in part on said received actual service priority profile.

5. The method according to claim 4, comprising communicating content for said announced services between said communication device and said service manager based at least in part on said determined capabilities and said received actual service priority profile.

6. The method according to claim 4, comprising notifying said communication device to receive said announced services via at least one other communication device.

7. The method according to claim 1, wherein said services comprise carrier grade services subscribed by said communication device.

8. The method according to claim 7, comprising stopping communicating content for said subscribed carrier grade services between said communication device with said service manager.

9. The method according to claim 8, comprising communicating said content for said subscribed carrier grade services between at least one other communication device with said service manager.

10. The method according to claim 9, comprising:
  downloading said content for said subscribed carrier grade services; and
  communicating said downloaded content for said subscribed carrier grade services between said at least one other communication device with said service manager.

11. A system for communication, the system comprising:
one or more hardware processors, one or more circuits, or any combination thereof, in an IP multimedia gateway, said one or more hardware processors, one or more circuits, or any combination thereof, operable to:
  determine capabilities and a proposed service priority profile of a communication device that is communicatively coupled to said IP multimedia gateway, said proposed service priority profile of said communication device based at least in part on said determined capabilities of said communication device;
  transmit said determined capabilities and said determined proposed service priority profile to a service manager that is operable to provide services to said communication device;
  receive an actual service priority profile from said service manager, wherein said received actual service priority profile is generated by said service manager based at least in part on said transmitted capabilities and said transmitted proposed service priority profile; and
  communicate content for services provided by said service manager between said communication device and said service manager based at least in part on said received actual service priority profile.

12. The system according to claim 11, wherein said one or more hardware processors, one or more circuits, or any combination thereof, is operable to configure said determined capabilities of said one or more of said communication device based at least in part on said received actual service priority profile.

13. The system according to claim 12, wherein said one or more hardware processors, one or more circuits, or any combination thereof, is operable to transmit said configured capabilities of said communication device to said service manager for subsequent service scheduling.

14. The system according to claim 11, wherein said one or more hardware processors, one or more circuits, or any combination thereof, is operable to announce services to said communication device, provided by said service manager based at least in part on said received actual service priority profile to notify said communication device.

15. The system according to claim 14, wherein said one or more hardware processors, one or more circuits, or any combination thereof, is operable to communicate content for said announced services between said communication device and said service manager based at least in part on said determined capabilities and said received actual service priority profile.

16. The system according to claim 14, wherein said one or more hardware processors, one or more circuits, or any combination thereof, is operable to notify said communication device to receive said announced services via at least one other communication device.

17. The system according to claim 11, wherein said services comprise carrier grade services subscribed by said communication device.

18. The system according to claim 17, wherein said one or more hardware processors, one or more circuits, or any combination thereof, is operable to stop communicating content for said subscribed carrier grade services between said communication device with said service manager.

19. The system according to claim 18, wherein said one or more hardware processors, one or more circuits, or any combination thereof, is operable to communicate said content for said subscribed carrier grade services between at least one other communication device with said service manager.

20. The system according to claim 19, wherein said one or more hardware processors, one or more circuits, or any combination thereof, is operable to download said content for said subscribed carrier grade services; and communicate said downloaded content for said subscribed carrier grade services between said at least one other communication device with said service manager.

* * * * *